United States Patent [19]

Teegarden et al.

[11] Patent Number: 4,782,274

[45] Date of Patent: Nov. 1, 1988

[54] END EFFECTOR FOR ROBOTIC SYSTEM

[75] Inventors: Daniel J. Teegarden, Columbia; Ernst R. Pemsel, Ellicott City, both of Md.

[73] Assignee: Westinghouse Electric Corp., Pittsburgh, Pa.

[21] Appl. No.: 76,965

[22] Filed: Jul. 23, 1987

[51] Int. Cl.⁴ .............................................. B25J 9/18
[52] U.S. Cl. ..................................... 318/568; 29/759; 81/451; 901/30
[58] Field of Search .......... 318/566, 567, 568, 568 D; 29/759; 81/125.1, 451; 364/513; 414/69, 70, 72, 82, 676, 908; 901/30, 50

[56] References Cited

U.S. PATENT DOCUMENTS

| | | | |
|---|---|---|---|
| 3,904,945 | 9/1975 | Hassan et al. | 318/593 |
| 4,287,459 | 9/1981 | Dahlstrom | 318/568 |
| 4,562,391 | 12/1985 | Inoue | 318/568 D |
| 4,587,618 | 5/1986 | Oguchi | 364/513 |
| 4,604,024 | 8/1986 | Edwards et al. | 901/50 X |
| 4,609,856 | 9/1986 | Hirose et al. | 318/567 X |
| 4,658,193 | 4/1987 | Low | 318/568 |
| 4,687,979 | 8/1987 | Ashton et al. | 318/568 X |
| 4,694,230 | 9/1987 | Slocum et al. | 318/568 |

Primary Examiner—Bentsu Ro
Attorney, Agent, or Firm—W. G. Sutcliff

[57] ABSTRACT

An end effector, which is adapted to be disposed on a movable industrial manipulator arm, is capable of placing a holed object having an opening therethrough onto a stud member. The end effector includes a tool adapted to centrally releasably support the holed object and a support mount slidingly connected to the tool for mounting the tool to the industrial manipulator arm. A first sensing system is utilized for sensing when the holed object has been aligned with, and is disposed about, the stud member, and a second sensing system is used for sensing when the holed object is misaligned with the stud member. A third sensing system is provided for determining the amount of misalignment between the holed object and the stud member in one of two planar directions, and a fourth sensing system is included for determining the amount of misalignment between the holed object and the stud member in the other of the two planar directions.

19 Claims, 4 Drawing Sheets ated manufacturing systems, and more particularly to an end effector for use with a robotic manipulator arm which can accurately sense the location of a stud member and place a holed object thereupon.

END EFFECTOR FOR ROBOTIC SYSTEM

BACKGROUND OF THE INVENTION

This invention relates generally to automated manufacturing systems, and more particularly to an end effector for use with a robotic manipulator arm which can accurately sense the location of a stud member and place a holed object thereupon.

Factory automation systems are being designed to automate repetitive tasks in the manufacturing process. These automated systems typically include industrial robots or manipulators which are movable to accomplish a variety controller. These robots and the tasks they perform are generally changeable through software programming in the computer-based controller. One repetitive task for which automated tooling could be particular useful is the placing of washers or drive nuts on threaded studs which protrude through a horizontal flat surface. The data describing the location of each stud is provided from a data base in the computer, which manipulates the robotic arm and the end effector disposed thereon to the desired location to place the washers and nuts on the studs. A problem encountered in performing this task is that the combined effect of robot inaccuracy, stud coordinate inaccuracy and vertical misalignment of the stud could make it impossible to accurately place the washer and drive the nut, on a consistent repetitive basis.

SUMMARY OF THE INVENTION

In accordance with the present invention, described is an end effector adapted to be disposed on a movable industrial manipulator arm which is capable of placing a holed object having an opening therethrough onto a stud member. The end effector is comprised of a tool adapted to centrally releasably support the holed object and mounting means slidingly connected to the tool for mounting the tool to the industrial manipulator arm. Four sensing means are part of the end effector, being utilized for accurately determining the spatial location of the end effector with respect to the stud member. A first sensing means is utilized for sensing when the holed object has been aligned with, and is disposed about, the stud member, and a second sensing means is included for sensing when the holed object is misaligned with the stud member. Third sensing means are present for determining the amount of misalignment between the holed object and the stud member in one of two planar directions, and fourth sensing means are used for determining the amount of misalignment between the holed object and the stud member in the other of the two planar directions.

BRIEF DESCRIPTION OF THE DRAWINGS

Reference is now made to the description of the preferred embodiment, illustrated in the accompanying drawings, in which.

DESCRIPTION OF THE PREFERRED EMBODIMENT

Figures 1, 3:
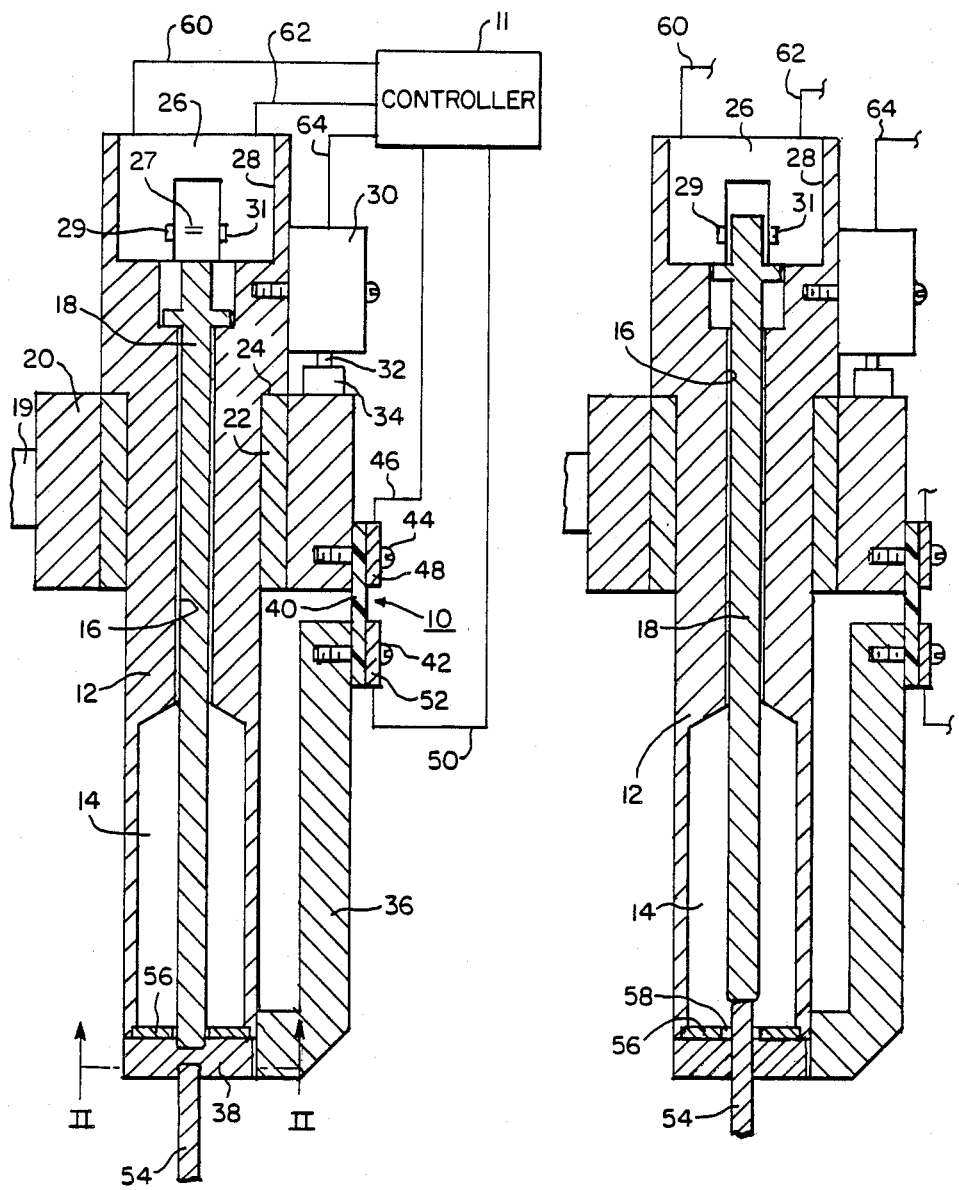
FIG. 1 is a cross-sectional view of the industrial manipulator arm end effector according to the teachings of the present invention.
FIG. 3 is a cross-sectional view of the end effector showing a washer aligned with a stud member.
Figure 2:
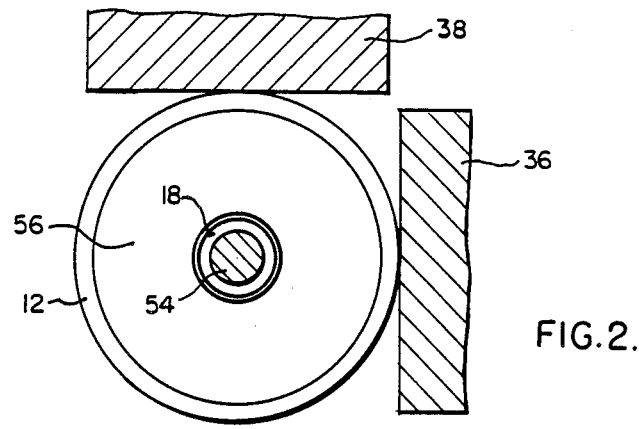
FIG. 2 is an end view taken along line 2—2 of FIG. 1.

Referring now more particularly to FIGS. 1 and 2, therein is illustrated an end effector 10 according to the teachings of the present invention. The end effector 10 is adapted to be disposed on a movable industrial manipulator arm, or robotic arm 19, which would be movable according to instructions received from a computer controller 11 in a manner well-known in the art. The end effector 10 is comprised of a vacuum tool 12 capable of drawing a vacuum within the interior 14 thereof, and has a centrally disposed opening 16 therein in which is disposed a movable center pin 18. The vacuum tool 12 is held by the manipulator arm 19 through the metallic arm mounting block 20, which would be fixedly secured to the manipulator arm 19. The mounting block 20 is fixedly connected to the steel bushing 22 which, in turn, is slidingly disposed about the vacuum tool 12, and more particularly abuts against the shoulder 24 of the vacuum tool 12 in its normal operating position.

Disposed at one end of the vacuum tool 12 is a through-beam photo switch 26 having an opening 28 therein through which a beam of light 27 of the photoswitch 26 extends. As illustrated, the beam of light 27 would extend from the emitter 29 to the detector 31 on opposite sides of the opening 28. The opening 28 is aligned with, and adapted to receive, the center pin 18.

Fixedly secured to, and movable with, the vacuum tool 12 is a microswitch 30 which has extending thereout from an actuating lever 32, which makes physical contact with the mounting block 20. The microswitch 30 is connected to the controller 11 through the pair of electrical connectors 64.

Disposed about the vacuum tool 12 are a pair of locating members or paddles 36, 38 disposed at right angles to each other. As illustrated in FIG. 1, the locating paddle 36 is physically connected to and movable with the mounting block 20 through the flexible insulating member 40 constructed of a material such as plastic. The screws 42, 44 are utilized to secure the flexible member 40 to the paddle 36 and the mounting block 20 respectively. The screw 44, additionally, is utilized for providing electrical connection between the mounting block 20 and the electrical lead 46 which extends from the contact plate 48 adjacent the mounting block 20, while the screw 42 provides electrical contact between the metallic paddle 36 and the electrical lead 50 which is connected to the contact plate 52. The flexible insulating member 40 acts as a hinge member whenever the locating paddle 36 is utilized for locating the stud member 54. The paddle 38, although not illustrated in FIG.

1, is connected via a similar structure to the mounting block 20.

In use, the vacuum tool 12 would create a vacuum within its interior opening 14 which could be utilized to pick up a washer 56, for example, from a feeder device which washer 56 is to be mounted on, or placed over, the stud 54.

In operation, the central computer controller 11 would have information within its data bank or memory concerning the location of the stud member 54 and the position of the manipulator arm 19 and end effector 10. The controller 11 would instruct the manipulator arm 19 to move the end effector 10 so that it is disposed over the perceived location of the stud member 54. Referring now to FIG. 3, if the information transmitted from the controller 11 to the, eventually, end effector 10 is correct, the end effector 10 would be disposed and aligned with the stud member 54 such that the washer 56 would be placed upon the stud member 54. Upon this occurrence, the stud member 54 extends through the central opening 58 of the washer to interiorly 14 of the tool 12, and pushes against the central pin 18. Since the central pin 18 is longitudinally movable within the opening 16, the pin 18 is moved upwardly into the opening 28 in the photoswitch 26, breaking the beam 27 between the emitter 29 and detector 31 legs of the photoswitch 26.

As soon as the beam 27 is broken, an indication of such occurrence is transmitted through the leads 60, 62 of the photoswitch 26 to the computer controller 11, which would then halt the downward motion of the manipulator arm 19 and the end effector 10. At that time, the vacuum within the vacuum tool 12 would be released, thereby enabling the washer 56 to be placed upon the stud member 54 with the knowledge that such placement is accurate. As an additional benefit, the vertical height of the stud number 54 with respect to the robot is also readily determinable since it is know precisely the distance that the center pin 18 must travel from its normal position to its position blocking the photo beam 27.

Figure 4:
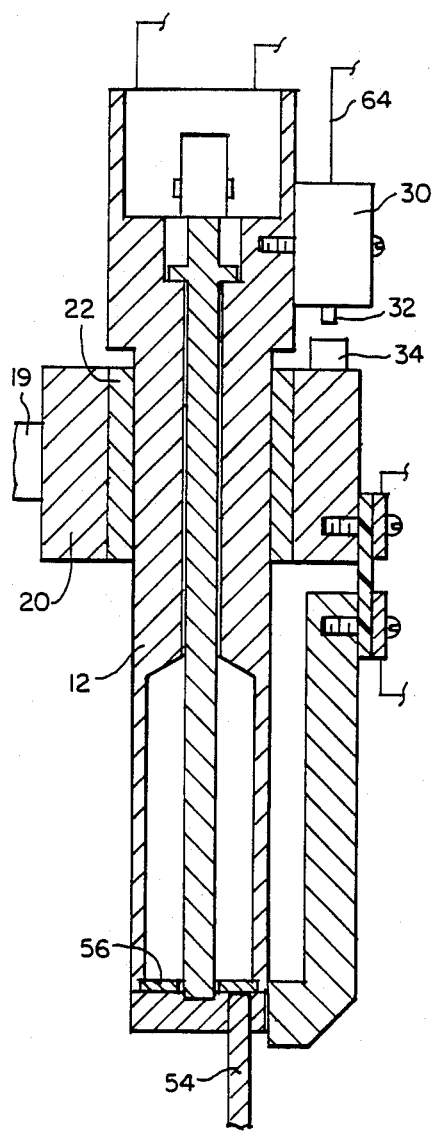
FIG. 4 is a cross-sectional view of the end effector illustrating misalignment of the washer with the stud member.

As was described previously, one of the problems encountered in utilizing such automated placement tools is that the combined effects of robot inaccuracy, stud coordinate inaccuracy, and vertical misalignment of the stud could result in the situation, as illustrated in FIG. 4, where the opening 58 in the washer 56 is not aligned with the stud member 54. When this situation occurs, the downward movement of the manipulator arm 19 causes the stud member 54 to contact the washer 56, and further downward motion of the robotic arm 19 causes the stud member 54 to push the vacuum tool 12 upwardly with respect to the mounting block 20 fixedly connected to the manipulator arm 19. This relative motion is possible because of the slip-fit connection between the mounting block 20 and the vacuum tool 12 through the bushing 22. When the vacuum tool 12 is pushed upwards with respect to the mounting block 20, roller end 34 of the actuating lever 32 separates from the mounting block 20, causing a reversal of the position of the contacts (not shown) within the microswitch 30 and causing a signal to be transmitted through the connectors 64 to the central controller 11 indicating the stud misalignment problem. Once the controller 11 receives such a signal, it halts the further downward motion of the manipulator arm 19 and instructs the arm 19 to move the end effector 10 upwardly a predetermined distance. The controller 11 then utilizes the locating paddles 36, 38 to find the precise location of the stud member 54 as it relates to the vacuum tool 12. This is illustrated in FIGS. 5-9.

Figure 6:
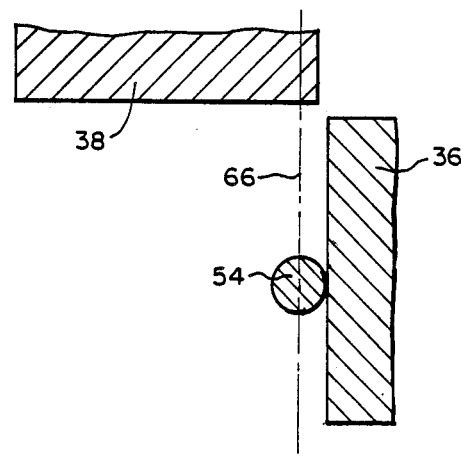
FIG. 6 is a schematic view illustrating how the first axis of the stud member is determined.
Figure 5:
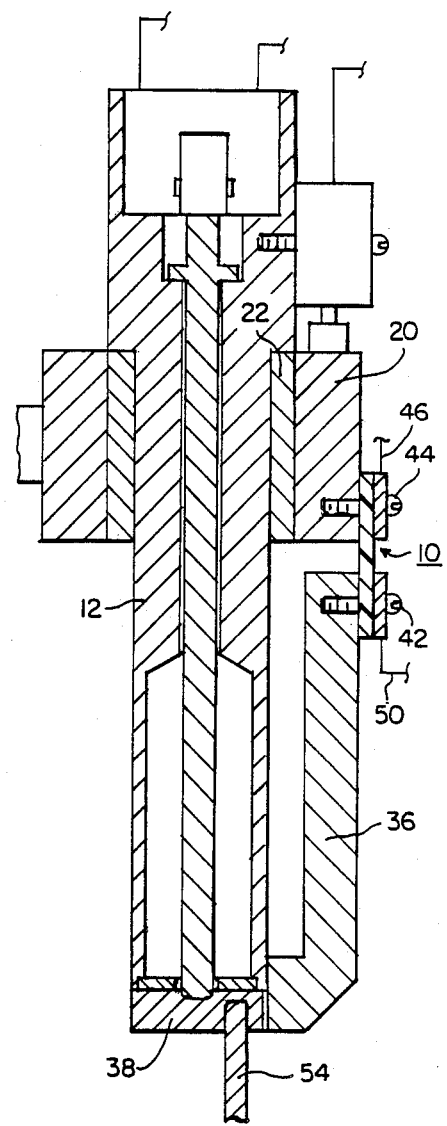
FIG. 5 is a cross-sectional view of the end effector illustrating the position of the various elements when determining the location of the stud member in a first planar direction.

Referring now more particularly to FIGS. 5 and 6, once the computer controller 11 knows that there is a misalignment problem, it moves the end effector 10 to the left as illustrated in the drawings until such time as the paddle 36 contacts the stud member 54 and is moved away from the vacuum tool 12. Once the stud member 54 causes the paddle 36 to be moved away from the vacuum tool 12, the electrical circuit which is comprised of the lead 50, the screw 42, the paddle 36, the vacuum tool 12, the bushing 22, the mounting block 20, the screw 44, and the lead 46 is broken, thereby sending a signal to the controller 11 that indicates where the axis 66 in one planar direction of the stud member 54 is located. The computer controller 11 then stores such information for further use and processing.

Figure 9:
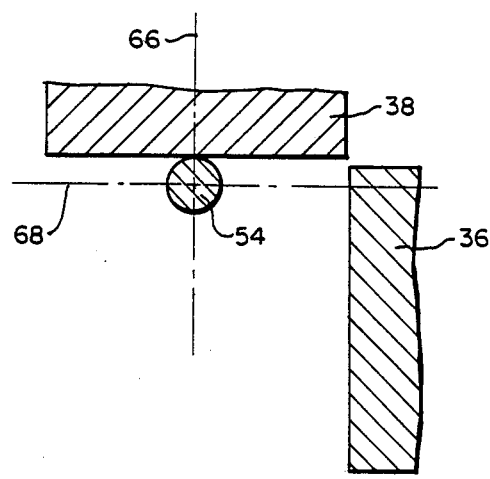
FIG. 9 is a schematic view illustrating how the precise location of the stud member is determined.
Figure 7:
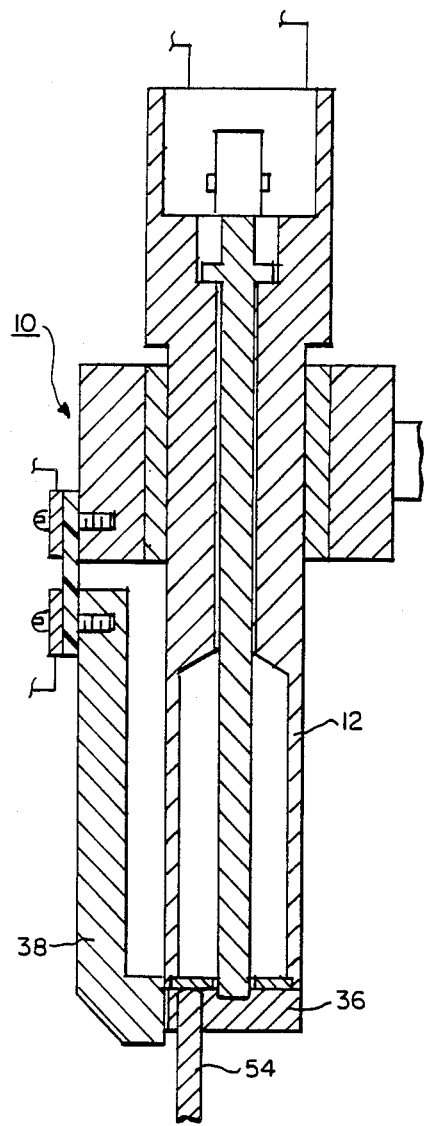
FIG. 7 is a view rotated 90° from that shown in FIG. 4.
Figure 8:
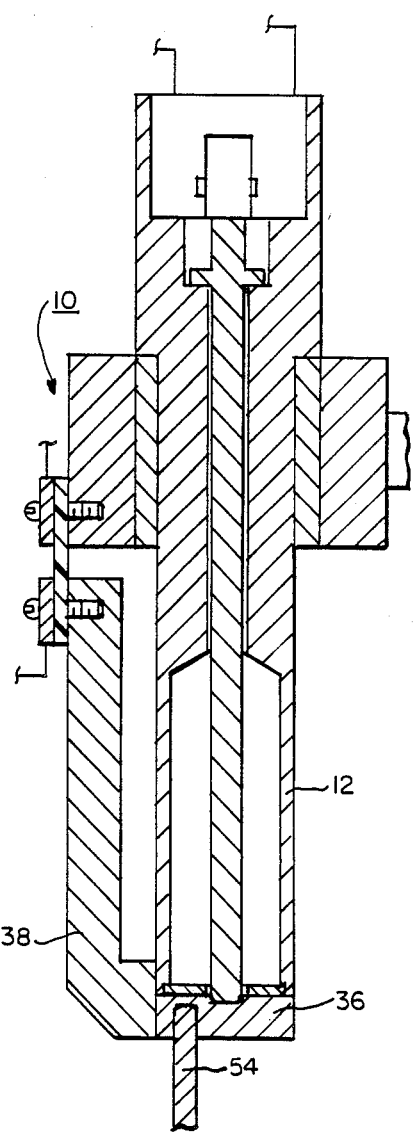
FIG. 8 is a view similar to that of FIG. 5, with the view rotated 90°.

Once the first axis 66 is known, the end effector 10 moves perpendicularly to the first motion, the result being illustrated in FIG. 7-9, which views have been rotated 90° from those shown in FIGS. 2-4 for ease in understanding. The robotic arm 19 and the end effector 10 are moved so that the locating paddle 38 is centered along, and aligned with, the axis 66 through the stud member 54 (FIG. 7).

Once in this location, the end effector 10 is moved, to the right as illustrated in the drawings, until such time as the locating paddle 38 is moved by the stud member 54 away from the vacuum tool 12, (FIG. 8) in a manner similar to that described with respect to locating paddle 36. In this fashion, the axis 68 through the stud member 54 in the second of the two planar directions is also determined. At this time, the computer controller 11 has the precise coordinates where the two axes 66,68 are located and can move the end effector 10 to such location to place the washer 56 over the stud member 54. This placement occurs as was described previously with respect to FIGS. 1-3.

Thus, it can be seen that the present invention provides an improved parts placement system which provides for positive indication of successful placement and which can also automatically compensate for misalignment and inaccuracies.

I claim as my invention:

1. An end effector adapted to be disposed on a movable industrial manipulator arm capable of placing a holed object having an opening therethrough on a stud member comprising:

a tool adapted to centrally releasably support said holed object;

mounting means slidingly connected to said tool for mounting said tool to said industrial manipulator arm;

first sensing means for sensing when said holed object has been aligned with, and is disposed about, said stud member;

second sensing means for sensing when said holed object is misaligned with said stud member;

third sensing means for determining the amount of misalignment between said holed object and said stud member in one of two planar directions; and fourth sensing means for determining the amount of misalignment between said holed object and said stud member in the other of the two planar directions.

2. The end effector according to claim 1 wherein said first sensing means comprises;

a movable center pin disposed within said tool and extending through the opening in said holed object; and a through-beam photo switch disposed in the path of movement of said center pin, when said holed object is aligned with and disposed about said stud member, said stud member contacting said center pin and causing movement of said center pin so as to block the beam of said photo switch.

3. The end effector according to claim 2 wherein said photo switch, upon blocking of its beam, causes said tool to release said holed object.

4. The end effector according to claim 1 wherein said tool is a vacuum tool which utilizes a vacuum to support said holed object, said vacuum tool releasing its vacuum to release said holed object whenever said first sensing means indicates said holed object is alilgned with, and disposed about, said stud member.

5. The end effector according to claim 1 wherein said second sensing means comprises a switch having a first contact secured to and movable with said tool and a second contact secured to said mounting means, misalignment of said stud member and said holed object causing said switch first and second contacts to separate.

6. The end effector according to claim 5 wherein misalignment of said stud member and said holed object causes said stud member to move said tool relative to said mounting means to cause the separation of said switch first and second contacts.

7. The end effector according to claim 1 wherein said third sensing means comprises a first locating member secured to said mounting means and physically and electrically contacting said tool, said first locating member being movable in a first planar direction.

8. The end effector according to claim 7 wherein said third sensing means further comprises first circuit means for sensing the contacting engagement of said first locating member and said tool and for indicating the separation of said first locating member from said tool.

9. The end effector according to claim 8 wherein said stud member, upon misalignment with said holed object, contacts said first locating member and causes said first locating member to move in said first planar direction and separate from said tool, said first circuit means sensing the separation of said first locating member from said tool and generating a first signal indicative of the amount of misalignment of said stud member and said holed object in said first planar direction.

10. The end effector according to claim 1 wherein said fourth sensing means comprises a second locating member secured to said mounting means and physically and electrically contacting said tool, said second locating member being movable in a second planar direction.

11. The end effector according to claim 10 wherein said fourth sensing means further comprises second circuit means for sensing the contacting engagement of said second locating member and said tool and for indicating the separation of said second locating member from said tool.

12. The end effector according to claim 11 wherein said stud member, upon misalignment with said holed object, contacts said second locating member and causes said second locating member to move in said second planar direction and separate from said tool, said second circuit means sensing the separation of said second locating member from said tool and generating a second signal indicative of the amount of misalignment of said stud member and said holed object in said second planar direction.

13. An automated placement system for placing a holed object having an opening therethrough onto a stud member comprising:

a movable manipulator arm;

a controller connected to, and controlling movement of, said manipulator arm;

a tool adapted to centrally releasably support said holed object;

mounting means connected to said tool for mounting said tool to said manipulator arm;

alignment sensing means for sensing the extent of alignment between said holed object and said stud member; and location determining means for determing the spatial location of said stud member with respect to said holed object, said location determining means having first and second locating members secured to said mounting means and physically and electrically contacting said tool at a ninety degree angle to each other, said first locating member being movable in a first planar direction and said second locating member being movable in a second planar direction at a right angle to said first planar direction.

14. The placement system according to claim 13 wherein said tool is a vacuum tool which utilizes a vacuum to support said holed object, said vacuum tool releasing its vacuum to release said holed object whenever said alignment sensing means indicates said holes object is aligned with, and disposed about, said stud member.

15. The placement system according to claim 13 wherein said alignment sensing means comprises:

a movable center pin disposed within said tool and extending through the opening in said holed object; and a through-beam photo switch disposed in the path of movement of said center pin, when said holed object is aligned with and disposed about said stud member, said stud member contacting said center pin and causing movement of said center pin so as to block the beam of said photo switch, said photo switch, upon blocking of its beam, causing said tool to release said holed object.

16. The placement system according to claim 15 wherein said alignment sensing means further comprises a switch having a first contact secured to and movable with said tool and a second contact secured to said mounting means, misalignment of said stud member and said holed object causing said stud member to move said tool relative to said mounting means to cause the separation of said switch first and second contacts.

17. The placement system according to calim 13 wherein said location determining means further comprises;

first circuit means for sensing the contacting engagement of said first locating member and said tool and for indicating the separation of said first locating member from said tool; and second circuit means for sensing the contacting engagement of said second locating member and said tool and for indicating the separation of said second locating member from said tool.

18. The placement system according to claim 17 wherein said stud member, upon misalignment with said holed object, contacts said first locating member and causes said first locating member to move in said first planar direction and separate from said tool, said frist circuit means sensing the separation of said first location member from said tool and transmitting a first signal to said controller indicative of the amount of misalignment of said stud member and said holed object in said first planar direction;

said stud member, upon misalignment with said holed object, contacts said second locating member and causes said second locating member to move in said second planar direction and separate from said tool, said second circuit means sensing the separation of said second locating member from said tool and transmitting a second signal to said controller indicative of the amount of misalignment of said stud member and said holed object in said second planar direction.

19. The placement system according to claim 18 wherein said controller, upon receipt of said first and second signals, causes the movement of said manipulator arm to align said holed object and said stud member.

* * * * *